United States Patent [19]
Kogane

[11] 4,252,436
[45] Feb. 24, 1981

[54] NEGATIVE FILM CARRIER
[75] Inventor: Mikio Kogane, Minami-ashigara, Japan
[73] Assignee: Fuji Photo Film Co., Ltd., Minami-ashigara, Japan
[21] Appl. No.: 72,520
[22] Filed: Sep. 4, 1979
[30] Foreign Application Priority Data
  Sep. 11, 1978 [JP] Japan ................. 53/111579
[51] Int. Cl.³ .......................................... G03B 27/62
[52] U.S. Cl. ............................................... 355/75
[58] Field of Search ................................. 355/74–76
[56] References Cited
U.S. PATENT DOCUMENTS

| 2,995,979 | 8/1961 | Gordon et al. | 355/74 X |
| 3,418,042 | 12/1968 | Sigl | 355/76 X |
| 4,161,365 | 7/1979 | Anderson et al. | 355/75 |
| 4,189,228 | 2/1980 | Farrell | 355/75 X |

FOREIGN PATENT DOCUMENTS
536036 4/1941 United Kingdom ............... 355/75

Primary Examiner—Richard A. Wintercorn
Attorney, Agent, or Firm—Sughrue, Rothwell, Mion, Zinn and Macpeak

[57] ABSTRACT

A negative film carrier having a movable print window frame with 135 size and 126 size windows for trimming frame of a negative film. A depressing window frame positions the negative film on the print window frame. A guide member arranged perpendicular to the print window frame guides the position of travel of the negative film to the printing position. A scanner at the printing position is moved in synchronism with the print window frame to detect picture image data from the negative film and is positioned in accordance with the window used for the two types of film.

10 Claims, 2 Drawing Figures

NEGATIVE FILM CARRIER

BACKGROUND OF THE INVENTION

This invention relates to a negative film carrier for printing a picture image of a negative film onto a photographic paper, and more particularly, to a type thereof commonly usable for printing 135 and 126 negative films.

135 negative film is generally referred to as "35 mm film", wherein a plurality of perforations are formed along both longitudinal edge portions of the film, and rectangular frame is centrally provided. 126 negative film is generally referred to as "instamatic film" ("instamatic" is the registered trade mark by Eastman Kodak Company), wherein perforations are formed along the one side of longitudinal edge portion and square frame is provided at the displaced position toward the other side of longitudinal edge portion of the film at which no perforation is formed. Used preferably are the print windows having a length of (34±0.1) mm and width of (23±0.1) mm and having length of (28±0.1) mm and width of (28±0.1) mm for trimming picutre images of 135 negative film and 126 negative film, respectively. Such sizes of print windows have been set experimentally and are well known.

Recently, "cine-type" the development method has been provided for developing negative films, wherein a series of negative films spliced together are subject to continuous development treatment. Since the film cartridges of 135 negative film is different from those of 126 negative film, those films are visually distinguishable with each other, so that same size of negative films can be spliced together. (Though in case of 135 films, half size frame (24×18) mm and full size frame (24×36) mm are not distinguishable with each other.) However, it is possible to splice 135 film with 126 film for development.

Further, several advantages may be pointed out, for example, in terms of operational efficiency at printing, by splicing a series of spliced 135 films with a series of spliced 126 films each being previously subject to development. However, such splicing gives rise to several drawbacks.

For printing the picture image of the negative film onto the photographic paper, a center of a light source, frame and photographic paper should be in alignment with each other. The width of 135 negative film is the same as that of 126 negative film, however, the central point of the frames of 135 and 126 negative films are different. Therefore, relative position control is required in the optical system, photographic paper and guide means for guiding film travel in order to achieve above-mentioned alignment in conformity with the variation of negative films to be printed.

Generally, luminous energy or light quantity control of each of various color lights is performed for printing a picture image of the negative film onto photographic paper in response to detection signal obtained by a photoelectric scanning method which detects picture image information. Scanning is conducted and completed for each of picture image during negative film travel, intermittently moved to a position of the picture image frame at the printing position. In this regard, scanning is preferably started and terminated at the constant position. Since frame size and frame shape of 135 negative film and 126 negative film are different from each other, the scanning position should be changed in conformity with the negative films. Hence, scanning is accomplished at one frame during intermittent travel of the negative film.

According to a conventional photographic printing apparatus, two kinds of negative film carriers are provided for exclusive use each having guide means, a print window frame and scanning means in order to selectively print 135 and 126 negative films. Accordingly, these negative film carriers are exchangingly mounted on the printing apparatus in accordance with the variations of negative films to be printed. Re-setting of the negative film carrier onto the printing apparatus is however rather troublesome in case of printing 135 and 126 negative films in one printing apparatus. Accordingly, it would be almost impossible to splice a series of spliced 135 negative films with a series of spliced 126 negative film amount is small relative to the 135 film amount or vice versa.

SUMMARY OF THE INVENTION

It is therefore, an object of this invention to overcome the above-mentioned drawbacks in the art.

It is another object of this invention to provide an improved negative film carrier commonly usable for printing 135 and 126 negative films.

These and other objects of this invention are accomplished by selectively moving a print window frame without exchanging the guide member for guiding the negative film to the printing position, the print window frame for trimming frame of the negative film and the scanner for detecting picture image.

The negative film carrier includes a print window frame for trimming frames of the negative film, a depressing window frame for pressingly position the negative film on the print window frame, and a guide member for guiding the travel of the negative film toward the printing position defined by the print window frame and the depressing window frame. The negative film carrier further includes a scanner for detecting picture image of frames by light scanning during travel of the negative film toward the printing position.

The above objects and others are attained in accordance with the present invention by providing a print window frame having a 135 size window and a 126 size window, each formed therein at neighbouring positions. These windows are selectively positioned at the printing position, during which the guide means and/or the scanning means selectively change their positions in synchronism with the movement of the print window frame in accordance with the kind of print film to be printed.

This invention will be described with reference to the accompanying drawings and the description of the preferred embodiment.

DETAILED DESCRIPTION OF THE INVENTION

Figure 2:
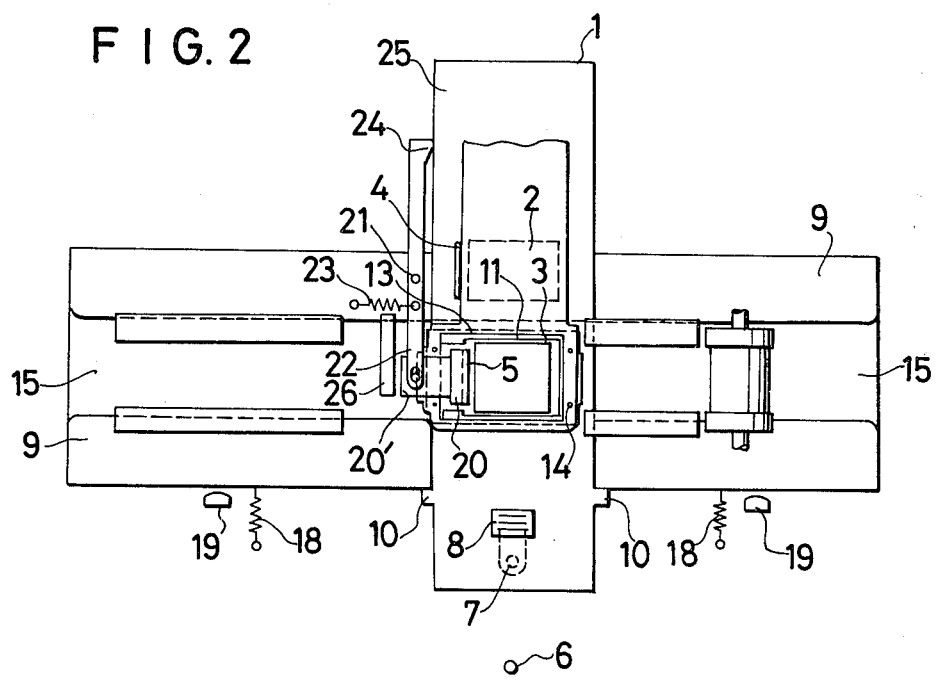
FIG. 2 shows a plan view of a negative film carrier according to this invention, in which 126 negative film is applied.

Referring now to the drawings, a print window frame 1 for trimming the frame of negative film is formed with a window 2 for printing 135 film frame, hereinafter referred to the 135 window, and window 3 for printing 126 film frame, hereinafter referred to the 126 window. The windows 2 and 3 are formed at neighbouring positions with respect to each other. Scanning windows 4, 5 adapted to perform scanning at each picture image frame are formed adjacent to the 135 and 126 windows 2, 3, respectively (scanning windows 4, 5 are formed at left side of the 135 and 126 windows, respectively in the drawings.) Further, click stoppers 6 and 7 are provided in order to lock the position of the print window frame 1 at its first and second positions, and a release knob 8 is provided to release locking engagement between the print window frame 1 and the click stoppers 6 and 7. A pair of protrusions 10 are provided at the print window frame 1 to abut a guide member 9 and move the guide member to a second position where the 126 window 3 is used defined by stopper 7 (FIG. 2). The guide member 9 is adapted to guide the travel of the negative film.

A depressing window frame 11 for pressingly positioning the negative film on the print window frame 1 is positioned below an opening 13 of a pressing rod 12 vertically movable upon the actuation of a solenoid (not shown). The frame 11 is engaged with the pressing rod 12 through pins 14 vertically extending therebetween, and springs (not shown) are mounted around the pins 14 in order to prevent the opening 13 from abruptly abutting on the depressing window frame 11.

The guide member 9 is centrally formed with a groove 15 having a width slightly larger than that of the negative film, and is positioned below a film-float-preventing member 16 and a feed roller 17 for feeding the negative film. In the drawings, the guide member 9 is sliding disposed with respect to the frame 1 and is spring biased by a spring 18. The spring-urging force is latched by a pair of stoppers 19 to define the first position (FIG. 1).

A scanner 20 is loosely connected to one end of lever 22 pivotally secured to the guide member 9 by a pin 21. The lever 22 is urged by a spring 23 to allow the lever 22 to rotate in clockwise direction in FIG. 1, to thus move the scanner 20 along the longitudinal direction of the guide means 9. The other end 24 of the lever 22 is in sliding contact with a left side fact 25 of the print window frame 1. Further, a stopper 26 is provided to prevent leftward movement of the scanner 20 by abutment between the stopper 26 and an end face 20' of the scanning means 20, when the tip end 24 of the lever 22 has slipped out of the side face 25 (FIG. 1).

Figure 1:
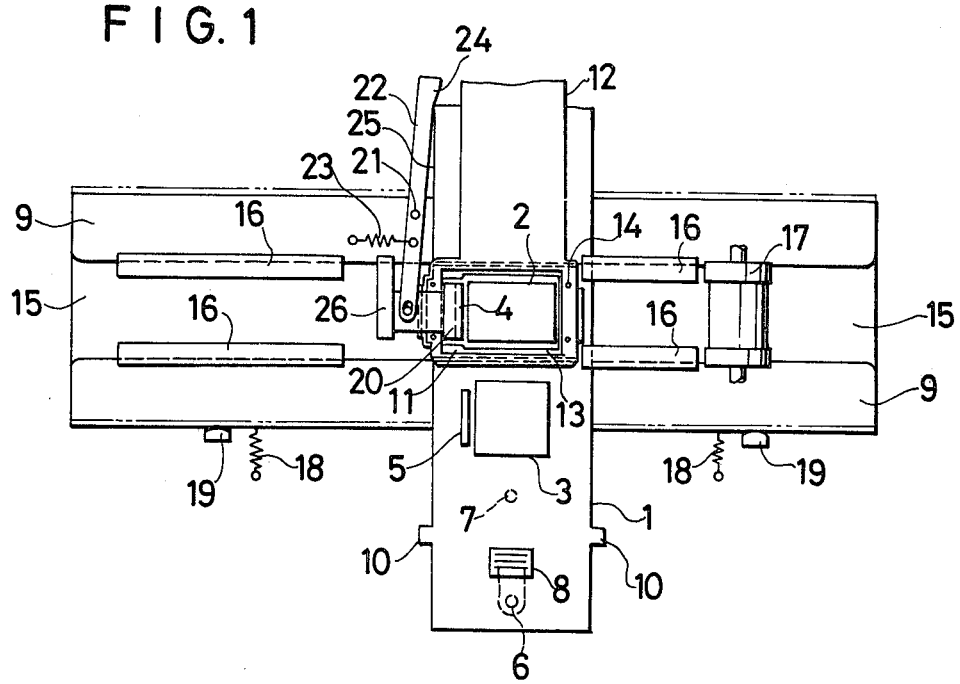
FIG. 1 shows a plan view of a negative film carrier according to this invention, in which 135 negative film is applied.

In FIG. 1, 135 film is applied to the negative film carrier, in which the print window frame 1 is locked by the click stopper 6 to provide alignment between the depression window frame 11 and the 135 window 2. The guide means 9 is positioned by the abutment between the pair of stoppers 19 and the guide means 9 urged toward the stoppers 19 by the springs 18.

The tip end 24 of the lever 22 is released from the left side from 25 of the spring window frame 1, so that the lever 22 is rotated in clockwise direction in the drawing by the biasing force of the spring 23, to thus move the scanning means 20 leftwardly. The leftward movement of the scanning means 20 is terminated upon abutment with the stopper 26, whereat light emitting and receiving portions are in alignment with the scanning window 4.

In FIG. 2, 126 film is applied to the negative film carrier in which the spring window frame 1 is locked by the click stopper 7 to provide alignment between the depression window frame 11 and the 126 window 3. The guide member 9 is positioned by the abutment between the pair of protrusions 10 against the biasing force of the spring 18. This position of the guide means is also shown by two dotted chain lines in FIG. 1. The tip end 24 of the lever 22 is in contact with the left side face 25 of the print window frame 1, so that the rotation of the lever 22 is prevented against the biasing force of the spring 23. Hence, the light emitting and receiving portions of the scanner 20 is in alignment with the scanning window 5.

The switching operation from 135 position (FIG. 1) to 126 position (FIG. 2) is achieved as follows.

The locking engagement between the click stopper 6 and the print window frame 1 is released by pushing the release knob 8, and then the print window frame 1 is moved upwardly in the drawing by upwardly urging the release knob 8, during which the click stopper 7 is brought into engagement with the frame 1 to lock the same. During the upward movement of the frame 1, the tip end 24 of the lever 22 is in sliding contact with the left side face 25 of the frame 1 to rotate the lever 22 abut the pin 21 in counterclockside direction in the drawing against the biasing force of the spring 23. As a result the scanner 20 is moved toward the right in the drawing to the distance of about 2.5 mm, and the protrusions 10 moves the guide member 9 upwardly in the drawing to the distance of about 1.6 mm because of the abutment therebetween.

The switching operation from 126 position to 135 position is achieved as follows.

The locking engagement between the click stopper 7 and the print window frame 1 is released by pushing the release knob 8 and then the print window frame 1 is moved downwardly in the drawing by downwardly urging the release knob 8, during which the click stopper 6 is brought into engagement with the frame 1 to lock the same. During the downward travel of the frame 1, since the urging force of the protrusions 10 toward the guide means 9 is reduced, the guide member 9 is moved downwardly by the restoring force of the spring 18 for a distance of about 1.6 mm, to thus abut on the stopper 19. At the same time the tip end 24 of the lever 22 slips off from the left side face 25 of the frame 1, so that the lever 22 is rotated about the pin 21 in clockwise direction by the biasing force of the spring 23. The scanner 20 is moved toward the left to the distance of about 2.5 mm.

In both positions, the center of the windows 2 or 3 is in alignment with the optical axis extending between the light source and the photographic paper. The light emitting and receiving portions of the scanning means 20 are in alignment with the scanning windows 4 or 5 positioned beside the windows 2 or 3, respectively.

According to the foregoing embodiment, the switching operation between 135 and 126 positions is manually carried out. However, the switching operation can be automatically carried out by detection signal in accordance with the film size.

As mentioned above, according to the negative film carrier of this invention, since the movement of the guide member and scanner is carried out in synchronism with the positional selection of 135 window or 125 window of the frame 1, such carrier easily permits the 135 and 126 negative films to print, to thus enhance practical use.

While the invention has been described in detail and with reference to specific embodiment thereof, it will be apparent to one skilled in the art that various changes and modifications can be made therein without departing from the spirit and scope thereof.

What is claimed is:

1. In the negative film carrier including a print window frame for trimming frame of a negative film, a depressing window frame for pressingly positioning the negative film on the print window frame, and a guide member for guiding the travel of the negative film to a printing position defined by the print window frame and the depressing window frame, the improvement comprising;
    said print window frame having a 135 size window and a 126 size window at adjacent positions with each other for selectively positioning either said 135 size window or 126 size window at the printing position by movement of said print window frame, and
    means to change the position of said guide member selectively in synchronism with the movement of said print window frame in positioning said 135 or 126 window at the printing position.

2. The negative film carrier as defined in claim 1, wherein said 135 and 126 size windows are formed at adjacent positions in a direction perpendicular to travelling direction of the negative film, and wherein said guide member is adapted to be moved along a direction perpendicular to the film travelling direction.

3. The negative film carrier of claim 2 further comprising engaging means on said print window frame for moving said guide member to a first position; stop means to define a second position for said guide member and bias means to urge said guide member into abutment with said stop means.

4. The negative film carrier of claim 3 further comprising stop elements defining said first and second positions and an engaging member on said print window frame to selectively engage one of said stop elements.

5. The negative film carrier of claims 1, 2, or 3 further comprising means for changing the position of a scanner in synchronism with the movement of said print window frame.

6. In a negative film carrier including a print window frame for trimming frame of a negative film, a depressing window frame to pressingly position the negative film on the print window frame, a guide member for guiding the negative film to a printing position defined by the print window frame and the depressing window frame, and scanning means for detecting picture image information of a frame of the negative film during travel thereof to the printing position, the improvement comprising;
    said print window frame having a 135 size window and a 126 size window formed at adjacent positions with each other to selectively position said 135 or 126 size window at the printing position by movement of said print window frame, and
    means for selectively changing the position of said scanning means in synchronism with the movement of said print window frame in selective positioning either said 135 or 126 size window at the printing position.

7. The negative film carrier as defined in claim 6, wherein said 135 and 126 size windows are formed at adjacent positions perpendicular to travelling direction of the negative film, and wherein said scanning means is moved along the direction parallel to the film travelling direction.

8. The negative film carrier as defined in claims 6 or 7 wherein said means for selectively changing the position of said scanning means comprises lever means pivotable with respect to said guide member said scanner means connected to one portion of said lever means for movement as a function of said lever means pivoting and a second portion of said lever means in contact with said guide member for pivotable action in response to movement of said guide member.

9. The negative film carrier as defined in claim 8 wherein said lever means further comprises a tip end in contact with said guide member at one position of movement thereof and a coupling at an opposite end of said lever means with said scanner means.

10. The negative film carrier as defined in claim 9 further comprising means to bias said tip end into contact with said guide member and stopper means to define a limit of travel of said scanner means at a second position of movement of said guide member.

* * * * *